April 23, 1963  A. A. GOFFSTEIN  3,087,118
COMBINATION ANTENNA AND RADIO SUPPORT FOR VEHICLES
Filed March 30, 1959  2 Sheets-Sheet 1

INVENTOR;
ALBERT A. GOFFSTEIN.

BY *Robert M. Dunning*

ATTORNEY

April 23, 1963 A. A. GOFFSTEIN 3,087,118
COMBINATION ANTENNA AND RADIO SUPPORT FOR VEHICLES
Filed March 30, 1959 2 Sheets-Sheet 2

INVENTOR,
ALBERT A. GOFFSTEIN.
BY
ATTORNEY

United States Patent Office 3,087,118
Patented Apr. 23, 1963

3,087,118
COMBINATION ANTENNA AND RADIO SUPPORT FOR VEHICLES
Albert A. Goffstein, St. Paul, Minn., assignor, by mesne assignments, to ATR Electronics, Inc., St. Paul, Minn., a corporation of Minnesota
Filed Mar. 30, 1959, Ser. No. 802,895
5 Claims. (Cl. 325—312)

This invention relates to an improvement in combination antenna and radio support for vehicles and deals particularly with a support for a radio used in the cab of a truck, in a station wagon, or other such vehicles.

During recent years the use of radio receiving sets in trucks and similar vehicles has become increasingly popular. In many instances, the instrument panel of these vehicles are not designed to accommodate the receiving set. Accordingly, it is often desirable that such radios be secured to the roof of the vehicle cabs to be supported from the roof in a substantially self-contained unit. It is the object of the present invention to provide a radio support of this type.

A feature of the present invention resides in the provision of a radio receiving set supporting means which includes a stud extending through the roof of the cab and which may be permanently attached to extend through the cab roof and to support a whip antenna. The lower end of this stud extends through the base of an inverted substantially U-shaped bracket yoke. This bracket yoke is designed to span the receiving set with the downwardly projecting arms of the yoke extending on opposite sides of the set. Opposite sides of the set are equipped with internally tapped mounting flanges which are formed as a part of the radio cabinet. Yoke attachment supporting screws extend through the opposite arms of the yoke and extend into the aligned internally threaded apertures of the mounting flanges. When thus engaged, the receiving set is supported in spaced relation below the roof of the cab and preferably above the upper edge of the windshield.

A feature of the present invention resides in the fact that the yoke supports the radio on opposed aligned axes, permitting the cabinet to be adjusted in position relative to the yoke about the axes of the supporting screws. Means are provided for tightening the supporting screws so that the opposed arms of the yoke are frictionally engaged against the mounting flanges on the radio cab, permitting the radio to be supported in an adjusted position.

A feature of the present invention resides in the provision of a radio supporting yoke which may, if desired, be rotatable about a vertical axis. Thus, if it is desired, the radio cabinet may be adjusted about a vertical axis as well as a horizontal axis.

A feature of the present invention resides in the provision of a radio mounting which may be secured to extend through the roof of the cab and which may remain in place in the event the radio is removed for repair or replacement. In removing the radio under such conditions, it is only necessary to disconnect the leads from the antenna and from the power supply, and to loosen the opposed thumb screws. When the ends of these thumb screws are retracted from the internally threaded mounting flanges on the radio set, the entire set may be removed without removing the antenna assembly and without leaving a hole in the roof of the cab during the time the radio is being repaired.

A further feature of the present invention lies in the provision of a radio support which may be easily mounted on the roof of the cab. In providing the mounting, a lead hole is usually drilled through the center line of the cab through the metal roof and ceiling head liner.

A hole of larger diameter designed to fit closely about the supporting stud is drilled through the metal roof. A considerably larger diameter hole is cut through the head liner. The yoke, with the mounting stud projecting upwardly therefrom, is inserted through the hole in the metal roof with one clamping plate being positioned beneath the metal roof and a second mounting flange overlying the outer surface of the roof. The area within the mounting flanges are filled with a suitable sealant material. The stud is provided with an externally threaded shank which accommodates a lock washer and nut to hold the stud in position extending through the roof. The antenna assembly is then attached to the upper end of the stud and the radio cabinet is supported between the parallel downwardly extending ears of the yoke. Suitable power connections and antenna connections are provided between the power source and the radio and the antenna and the radio. This may complete the assembly operation.

A feature of the present invention lies in the fact that supported brackets may be provided connecting opposite sides of the radio cabinet to the windshield header if so desired. These brackets hold the radio in fixed position or in proper adjustment. If desired, these brackets may be omitted where horizontal and rotary adjustment of the radio is desired.

These and other objects and novel features of the present invention will be more clearly and fully set forth in the following specifications and claims.

In the drawings forming a part of the specification:

Figure 1:
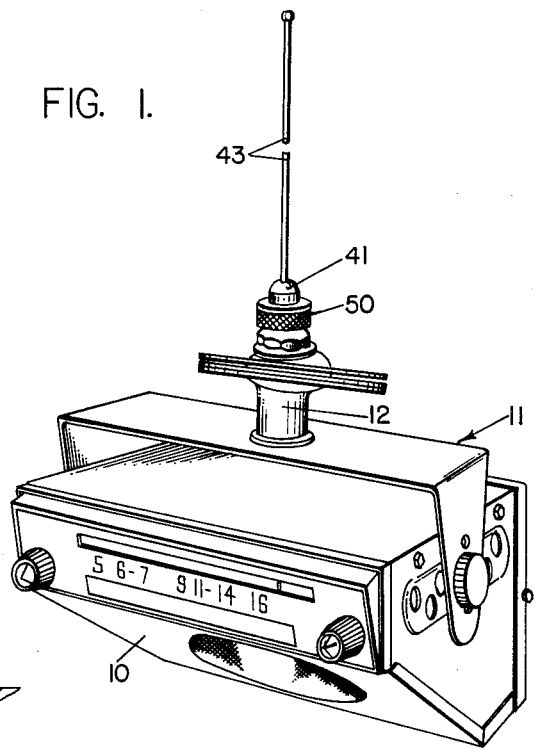
FIGURE 1 is a perspective view of the radio and radio support before assembly to the cab.
Figure 5:
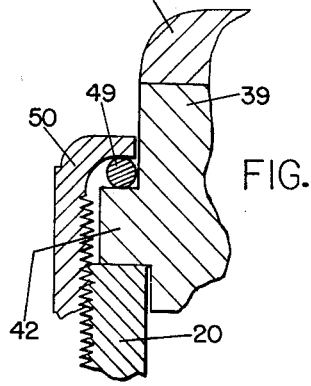

FIGURE 5 is an enlarged detail view of the seal between the supporting stud and the antenna assembly. The general arrangement of the parts is perhaps best illustrated in FIGURE 1 of the drawings. This figure illustrates a radio receiving set 10 which is supported by a yoke 11 which in turn is supported by a stud 12. The stud 12 extends through the roof of the vehicle illustrated in general by the letter A to support the radio receiving set 10, suspended beneath the roof.

Figure 3:
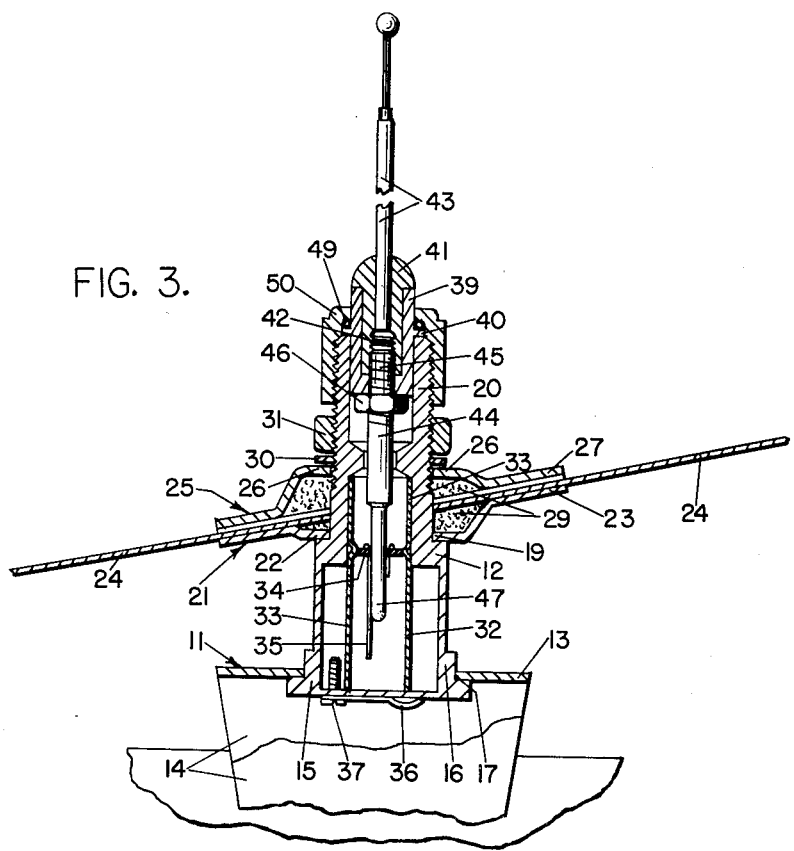
FIGURE 3 is an enlarged view of the mounting in sectional form.
Figure 4:
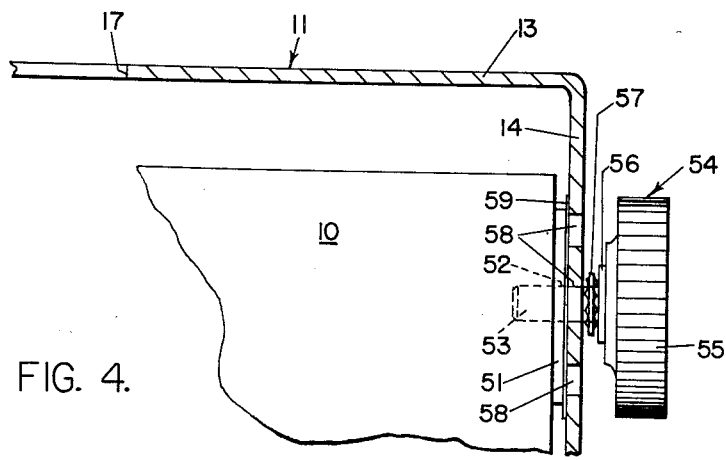
FIGURE 4 is a front elevational view of one of the yoke arms and the thumb nut used to connect this arm to the radio cabinet.

The yoke 11 includes a base member 13 which is designed to extend generally horizontally beneath the roof and which is provided with a pair of generally parallel arms 14 which extend downwardly therefrom at opposite ends thereof. As illustrated in FIGURE 3 of the drawings, the stud 12 is provided with a head portion 15 at its lower end which bears against the under surface of the base 13 of the yoke 11 and which includes a shank portion 16 which extends through an opening 17 at the center of the base 13 of the yoke. The shank 12 is of relatively large diameter and includes a shoulder 19 which connects the relatively large diameter lower portion with a shank portion 20 of the stud. The shank portion 20 is externally threaded for reasons which will be later described more in detail.

An internal flange 21 encircles the shank 20 and includes an apertured flat central portion 22 which rests upon the shoulder 19. The peripheral portion 23 of the flange 21 is normally inclined relative to the flat central portion 22 to fit the slant of the sheet steel roof 24 of the vehicle cab. An external flange indicated in general by the numeral 25 also encircles the stud shank 20 and includes a flat central portion 26 and an inclined peripheral portion 27 which is also shaped to fit the contour of the roof 24 and to extend in parallel relation to the peripheral portion 23 of the internal flange 21. The sealant material 29 is interposed between the central portions 22 and 26 of the flanges 21 and 25 and the truck sheet steel roof 24 to form a tight seal between the flanges and the roof.

A lock washer 30 encircles the shank 20 above the center portion 26 of the external flange 25 and is clamped by a jam nut 31 against the central flange portion 26. The nut 31 clamps the two flanges 21 and 25 together and clamps these flanges between the shoulder 19 and the nut 31.

The stud 12 is preferably hollow and is lined by a locking sleeve 32. A connector plug shell 33 is also provided in the hollow stud 12 which includes a conductive socket 34 at its lower ends. This conductive socket 34 is connected to a terminal 35 to which the antenna connection may be secured. The lead in wire extends from the terminal 35 through a clip 36 which is held in place by a machine screw 37 to prevent the lead in wire from being disengaged from the terminal 35.

An insulation sleeve 39 is provided with a peripheral shoulder 40 which bears against the top of the shank 20 of the stud 12 and which extends into the upper end of the stud. An antenna base 41 extends into the insulator sleeve 39 and is provided with an axial bore which terminates in an internally threaded socket 42 at its lower end. The antenna base 41 rests upon the top of the sleeve 39 and supports the base of the whip antenna 43. A connector pin 44 is provided with an externally threaded upper end 45 which is threaded into the antenna base 41 and is locked in relation thereto by means of a jam nut 46. The connector pin extends downwardly in spaced relation to the inner surface of the stud 12 and has its lower end 47 engaged in the socket 34 to provide an electrical connection between the whip antenna 43 and the lead in wire terminal 35.

An O ring 49 is supported upon the peripheral flange 40 of the insulation sleeve 39 and a stud cap 50 is threaded upon the upper end of the shank 20 of the stud 12 to hold the various parts assembled. Obviously, should the whip antenna 43 become damaged, it may be removed and replaced by disconnecting the cap 50 from the top of the stud and drawing the connector pin 44 upwardly so that its lower end 47 is disengaged from the socket 34.

The radio receiving set 10 is provided on opposite sides with internally tapped mounting flanges 51 which are secured to the outer surface of the set housing. The internally threaded apertures 52 of the flanges 51 are designed to accommodate the threaded shanks 53 of thumb screws 54. The thumb screws 54 are provided with enlarged heads 55 by means of which the thumb screws may be rotated and flat washers 56 are provided inwardly of the enlarged head 55. The shanks 53 of the set screws are arranged to extend through any opposed pair of apertures 58 in the yoke arms 14, providing vertical adjustment of the set. Lock washers 57 are interposed between the washers 56 and the outer surfaces of the arms 14 of the yoke 11. Friction discs 59 encircle the shanks 53 of the thumb screws 54 between the arms 14 and the internally threaded flanges 51. As a result, when the thumb screws 54 are tightened, the friction discs 59 are compressed between the arms 14 and the flanges 51 to resist relative rotation between the radio set 10 and the arms 14. At the same time, the thumb screws 54 form a detachable connection between the arms of the yoke and the radio set and by unthreading these thumb screws 54, the radio set 10 may be removed for repair or replacement without removing the yoke or detaching the antenna support.

Figure 2:
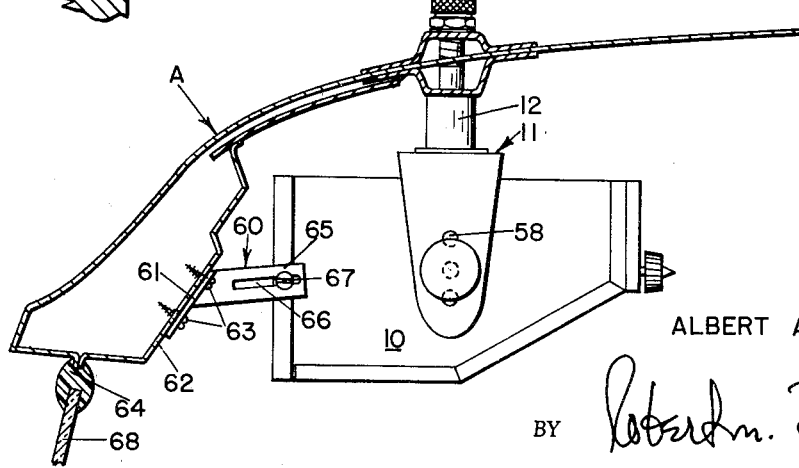
FIGURE 2 is a side elevational view of the radio and support, a part of the structure being broken away to show the mounting.

As indicated in FIGURE 2 of the drawings, angle brackets 60 may be provided to hold the radio set 10 from rotation when desired. These brackets 60 include the flange 61 attached to the windshield header 62 by a screw 63 or other suitable means. The windshield header 62 is normally above the level of the windshield 63 and is separated therefrom by a gasket 64. The bracket 60 also includes right angularly extending arms 65 which are slotted as indicated at 66 to accommodate fastening screws 67 which extend into the sides of the radio cabinet to hold the radio cabinet in fixed relation to the windshield header when it is so desired. In usual practice, these brackets 60 are secured to the windshield header after the radio 10 has been adjusted to a desired angle within the cab of the truck so as to hold the radio at a desired angle. However, these brackets may be detached if frequent adjustment of the position of the radio is desired.

The base 13 of the yoke 11 may be anchored to the stud 12 by press fit or by other suitable means if no adjustment of the radio about a vertical axis is desired. However, if preferred, the fit between the apertures 17 and the stud may be sufficiently loose to permit rotation of the yoke about the axis of the stud if such an adjustment is desired.

In accordance with the patent statutes, I have described the principles of construction and operation of my improvement in truck radio support, and while I have endeavored to set forth the best embodiment thereof, I desire to have it understood that changes may be made within the scope of the following claims without departing from the spirit of my invention.

I claim:

1. In combination, a vehicle radio receiving set, radio support and antenna including a hollow stud, a pair of clamping plates encircling said stud and engaging opposite surfaces of a vehicle top and holding said stud in fixed relation thereto, means for clamping said plates together, a yoke having a base secured intermediate its ends to the lower end of said stud, and spaced parallel arms on opposite ends of said base, aligned pivot means on said arms, said radio receiving set being pivotally supported between said arms by said aligned pivots, said antenna being supported by said stud projecting upwardly from the upper end thereof, and conductor means connecting said antenna to said receiving set and extending through said stud.

2. A combined antenna and radio support in combination with a vehicle having a roof, the support including a hollow stud extending through the roof on a generally vertical axis, said stud having an enlarged lower end, a yoke including a base having a central aperture therethrough through which said stud extends, said base resting upon said enlarged lower end of said stud for support thereby, said yoke having a pair of spaced downwardly extending arms on opposite ends of said base, aligned pivots on said arms, a radio supported between said arms by said pivots, clamping plates encircling said stud on opposite sides of said roof, means on said stud for clamping said plates against said roof, and an antenna supported in said stud and extending upwardly therefrom.

3. A vehicle radio support including an elongated stud having a bore extending therethrough and an external shoulder intermediate its ends providing a reduced diameter portion extending from the shoulder toward one end and a larger diameter portion extending from the shoulder toward the other end, a pair of outwardly dished plates having apertures of a diameter to encircle said reduced diameter portion of the stud and accommodating a portion of the vehicle roof therebetween, said reduced diameter portion having a threaded portion, a nut member encircling said threaded portion for applying pressure against one of said plates to cause the other plate to bear against the shoulder and thereby clamp the roof portion between said plates, an antenna element, means retaining one end of the antenna element within said reduced diameter stud portion, a radio receiver, and a U-shaped member on the larger diameter stud portion in fixed position having spaced arms for straddling said radio receiver, and means on said arms for engaging said receiver to retain same between said arms.

4. The structure of claim 3 including a sealing material contained in the dished portions of said plates.

5. The structure of claim 3 in which the larger diameter stud portion is formed with an enlarged head and said U-shaped member has an aperture encircling said larger diameter portion, said last-mentioned aperture benig smaller than said enlarged head so that said U-shaped member can be rotated about the longitudinal axis of said stud.

References Cited in the file of this patent

UNITED STATES PATENTS

| | | |
|---|---|---|
| 793,942 | Leach | July 4, 1905 |
| 1,221,705 | Duke | Apr. 3, 1917 |
| 1,723,866 | Knoderer | Aug. 6, 1929 |
| 1,766,190 | Rosenberg | June 24, 1930 |
| 1,787,251 | Jancke | Dec. 30, 1930 |
| 1,941,961 | Tichenor et al. | Jan. 2, 1934 |
| 2,077,284 | Te Pas | Apr. 13, 1937 |
| 2,454,897 | Trowbridge | Nov. 30, 1948 |
| 2,468,391 | Cejka | Apr. 26, 1949 |
| 2,670,919 | Esoldi | Mar. 2, 1954 |
| 2,699,909 | Turk | Jan. 18, 1955 |
| 2,786,884 | Chadowski et al. | Mar. 26, 1957 |
| 2,828,023 | Berra et al. | Mar. 25, 1958 |